(12) United States Patent
Delaney et al.

(10) Patent No.: US 12,375,353 B1
(45) Date of Patent: *Jul. 29, 2025

(54) SYSTEMS AND METHODS FOR PROVIDING A COMPUTER NETWORK HAVING MIGRATABLE NODES

(71) Applicant: Cyber IP Holdings, LLC, Herndon, VA (US)

(72) Inventors: Christopher Edward Delaney, Front Royal, VA (US); Carl Bailey Jacobs, Fredericksburg, VA (US)

(73) Assignee: Cyber IP Holdings, LLC, Herndon, VA (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/328,032

(22) Filed: Jun. 2, 2023

Related U.S. Application Data

(63) Continuation of application No. 17/727,869, filed on Apr. 25, 2022, now Pat. No. 11,677,626.

(60) Provisional application No. 63/181,535, filed on Apr. 29, 2021.

(51) Int. Cl.
| | |
|---|---|
| *G06F 15/177* | (2006.01) |
| *H04L 12/46* | (2006.01) |
| *H04L 41/0823* | (2022.01) |

(52) U.S. Cl.
CPC ...... *H04L 41/0823* (2013.01); *H04L 12/4633* (2013.01); *H04L 12/4641* (2013.01)

(58) Field of Classification Search
CPC ............. H04L 41/0823; H04L 12/4633; H04L 12/4641
See application file for complete search history.

(56) References Cited

U.S. PATENT DOCUMENTS

| | | | |
|---|---|---|---|
| 10,091,098 B1* | 10/2018 | Lorenz | .................. H04L 43/04 |
| 10,205,638 B1* | 2/2019 | Angrish | .................. H04L 41/40 |
| 10,397,189 B1* | 8/2019 | Hashmi | ............... H04L 63/0272 |
| 11,457,070 B2* | 9/2022 | Cardona-Gonzalez | ..................... H04L 67/141 |
| 2006/0187854 A1* | 8/2006 | Booth, III | ........... H04L 12/4691 370/254 |
| 2006/0187855 A1 | 8/2006 | Booth, III et al. | |
| 2010/0008253 A1 | 1/2010 | Mellachervu et al. | |
| 2019/0166040 A1* | 5/2019 | Tiwari | .................... H04L 45/22 |
| 2019/0312795 A1* | 10/2019 | Karve | ..................... H04L 67/10 |

(Continued)

*Primary Examiner* — Duyen M Doan
(74) *Attorney, Agent, or Firm* — Jones Day

(57) ABSTRACT

Systems and methods are provided for a computer-implemented method of implementing an on-demand computing network environment. An example system performs steps including configuring an on-demand computing network, wherein configuring includes assigning a first provisioned resource as a hub node; and assigning one or more second provisioned resources as rim nodes, wherein rim nodes are configured to communicate with one another via the hub node. They example system further moves a particular node of the on-demand computing network by provisioning a new provisioned resource as a new node to replace the particular node and configuring the new provisioned based on parameters associated with the particular node; establishing a tunnel between the new node and a neighboring node of the particular node; and deprovisioning the particular node such that traffic between the new node and the neighboring node traverses the established tunnel.

20 Claims, 13 Drawing Sheets

(56) References Cited

U.S. PATENT DOCUMENTS

| | | |
|---|---|---|
| 2021/0226847 A1* | 7/2021 | Jindal ................. H04L 61/5007 |
| 2021/0288881 A1 | 9/2021 | Zhang |
| 2023/0231845 A1* | 7/2023 | Manoharan ............. H04L 63/08 |
| | | 726/3 |

* cited by examiner

SYSTEMS AND METHODS FOR PROVIDING A COMPUTER NETWORK HAVING MIGRATABLE NODES

CROSS REFERENCE TO RELATED APPLICATIONS

This application is a continuation application of U.S. patent application Ser. No. 17/727,869, filed Apr. 25, 2022, which claims priority to U.S. Provisional Application No. 63/181,535, filed Apr. 29, 2021, both of which are incorporated herein by reference in their entireties.

FIELD

This disclosure is related generally to computer networking and more particularly to implementation of a computing network having movable nodes.

BACKGROUND

A computing network typically includes a plurality of computing devices that are connected with one another, either physically or wirelessly, such that those computing devices can communicate with one another. A network is typically constructed by acquiring, either physically or via contractual agreement, the resources necessary to implement a desired framework. Typically, such components are acquired on a component by component basis.

SUMMARY

Systems and methods are provided for a computer-implemented method of implementing an on-demand computing network environment. An example system performs steps including configuring an on-demand computing network, wherein configuring includes assigning a first provisioned resource as a hub node; and assigning one or more second provisioned resources as rim nodes, wherein rim nodes are configured to communicate with one another via the hub node. They example system further moves a particular node of the on-demand computing network by provisioning a new provisioned resource as a new node to replace the particular node and configuring the new provisioned based on parameters associated with the particular node; establishing a tunnel between the new node and a neighboring node of the particular node; and deprovisioning the particular node such that traffic between the new node and the neighboring node traverses the established tunnel.

As another example, a computer-implemented system for implementing an on-demand computing network environment includes a provisioned resource data store configured to store records associated with resources provisioned from one or more resource providers, wherein records in the provisioned resources data store include an identification of a particular resource and a particular on-demand computing network to which the particular resource has been assigned. A network implementation engine is configured to: assign a first provisioned resource as a hub node; assign one or more second provisioned resources as rim nodes, wherein rim nodes are configured to communicate with one another via the hub node; and move a particular node of the on-demand computing network. Moving the particular node includes provisioning a new provisioned resource as a new node to replace the particular node and configuring the new provisioned based on parameters associated with the particular node; establishing a tunnel between the new node and a neighboring node of the particular node; and deprovisioning the particular node such that traffic between the new node and the neighboring node traverses the established tunnel.

As a further example, a computer-readable medium encoded with instructions for commanding one or more data processors to execute a method for implementing an on-demand computing network environment. The example method includes configuring an on-demand computing network, wherein configuring comprises: assigning a first provisioned resource as a hub node; and assigning one or more second provisioned resources as rim nodes, wherein rim nodes are configured to communicate with one another via the hub node. The method further includes moving a particular node of the on-demand computing network by: provisioning a new provisioned resource as a new node to replace the particular node and configuring the new provisioned based on parameters associated with the particular node; establishing a tunnel between the new node and a neighboring node of the particular node; and deprovisioning the particular node such that traffic between the new node and the neighboring node traverses the established tunnel.

DETAILED DESCRIPTION

Figure 1:
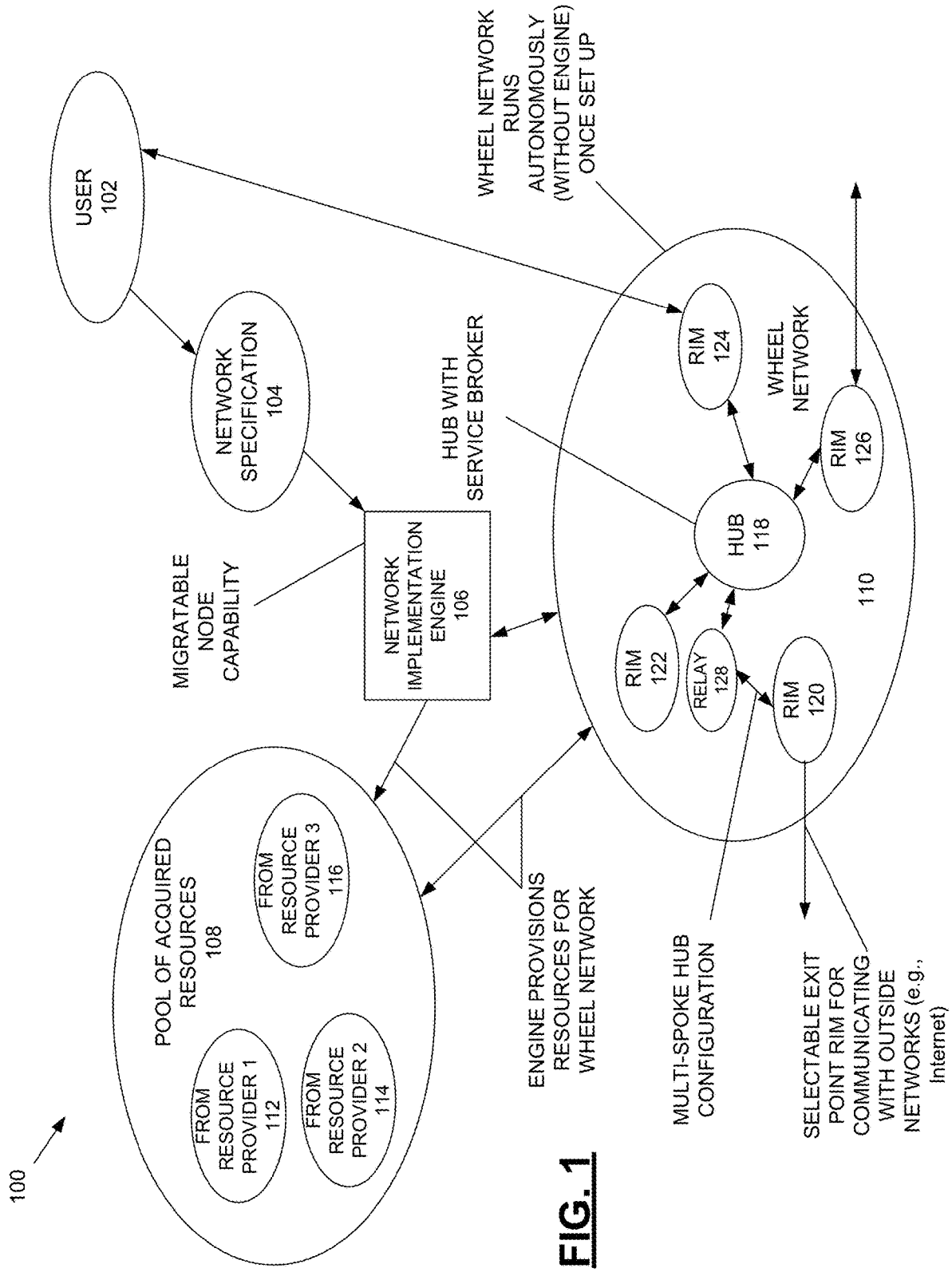
FIG. 1 is a block diagram depicting a computer-implemented environment for implementing an on-demand computing network.

FIG. 1 is a block diagram depicting a computer-implemented environment for implementing an on-demand computing network having migratable node capabilities. The environment 100 of FIG. 1 enables a user 102 to specify and acquire a network designed to the user's specification in real time. A user 102 transmits a network specification 104 that represents a desired network topology to a network implementation engine 106. The network implementation engine 106 interacts with a pool of acquired resources 108 to build a network 110 that corresponds with the desired network identified by the user in the network specification 104.

The network implementation engine 106 is configured to examine the network specification 104 and provision resources necessary to implement the user's desired network configuration. The pool of resources 108 may contain a variety of resources of different types, which may also come from different providers. For example, a first resource 112 may be a cloud processing resource ("third party compute service provider processing resource") acquired from a first provider who provides servers with processing capabilities available for accessing. A second resource 114 may be mail server or file server resource provided by the same provider or from a different provider. A third resource 116 may be a cellular communication resource from a third provider, where that cellular communication resource enables acquisition of voice or video conference data from a party via a device of that party's data communication capabilities. Other resources can include proxy server resources for forwarding traffic, media servers for providing media (e.g., video, audio, image), as well as others.

The network implementation engine 106 interacts with the pool of acquired resources 108 to provision resources needed to create the desired on-demand computing network 110. The network implementation engine 106 assigns the provisioned resources to the network and configures the network topology. In one implementation, the on-demand network 110 is configured as a wheel network having a hub device 118 (e.g., a server) and one or more rim devices 120, 122, 124, 126 that can take the form of servers of different types or other computing components. The rim devices communicate with one another, in one embodiment, only through the hub device 118, where communications between the hub device 118 and the rim devices can be via secure connections, such as a VPN connection. Communication between entities in the on-demand computing network may be via a secure channel such as Secure Socket Funneling (SSF), SSL tunneling, or other mechanisms. Certain of the rim devices (e.g., rim devices 120, 124, 126) can be configured as exit points that are permitted to communicate with computing resources outside of the on-demand network 110, such as to the Internet. These external communications can be via a variety of protocols, some of which may not be secure, such as Http, Ftp, cellular protocols, or otherwise. Rim device 124 is configured to provide a secure link from the user 102 to the hub device 118 and other resources of the network 110, such as via a VPN connection. Rim devices that are not identified as exit points are, in one embodiment, not permitted to communicate outside the network 110. Such rim devices (e.g., rim device 122) can be assigned other computing duties, such as providing a file server or a mail server.

In addition to direct connections between the hub 118 and rim devices, such connections can be implemented using a plurality of links ("joints") connected by joint relays. In the example of FIG. 1, the connection between the hub device 118 and rim device 120 includes two joints connected by a joint relay 128, which can be implemented using a proxy server configured to forward traffic. Utilization of a plurality of joints along a spoke from the hub device 118 to a rim device 120 provides an additional degree of anonymity, where rim device 120 can function without knowing a physical address of the hub device 118, knowing only to forward data to joint relay 128, and where hub device 118 can function without knowledge of a physical address of the rim device 120. In one embodiment, during network setup, the network implementation engine 106 configures the hub device 118 to communicate to rim device 120 via joint relay 128 without providing the physical address of rim device 120 to the hub device 118. The network implementation engine 106 similarly configures rim device 120 without informing rim device 120 of a physical address of the hub device 118. As noted at 106, and described further herein, the network implementation engine 106 is configured to implement migratable nodes in its network, in embodiments.

Figure 2:
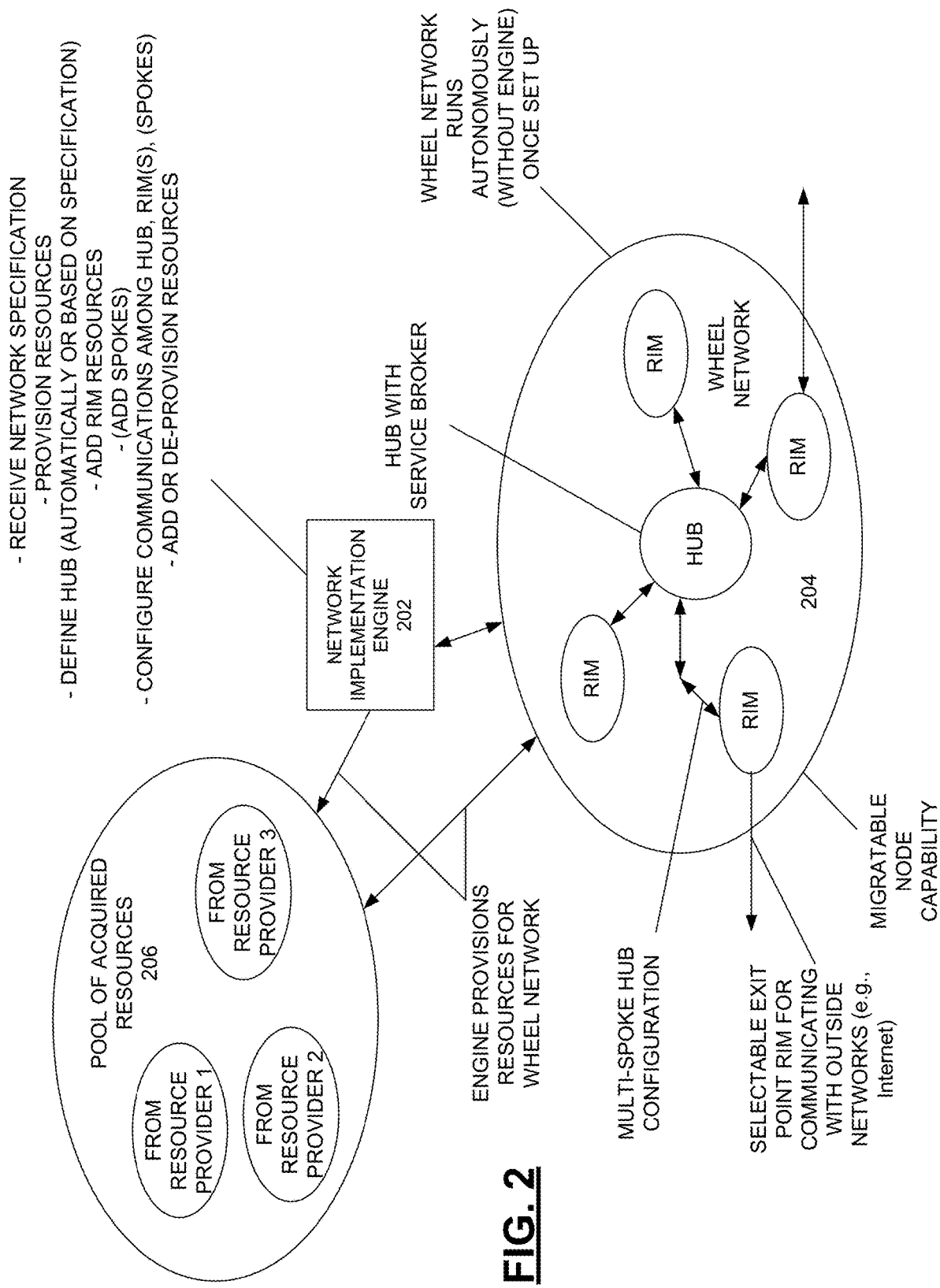
FIG. 2 is a diagram depicting a network implementation engine providing on-demand network setup and re-configuration operations.

FIG. 2 is a diagram depicting a network implementation engine providing on-demand network setup and re-configuration operations. The network implementation engine 202 builds the on-demand computing network 204 according to a user provided network specification, including implementing migratable node capabilities as described further herein. The network implementation engine 202 is also configured to add resources from a pool of acquired resources 206 to the network 204 and to de-provision resources when those resources are no longer needed. In one embodiment, only the network implementation engine 202 is permitted to add resources to or remove resources from the on-demand computing network 204.

To provision a resource to add it to the network 204, the network implementation engine 202 accesses the resource from the pool of acquired resources 206 if the needed resource is available. For example, the pool of acquired resources 206 may include a number of accounts with different third party computing service providers, online e-mail accounts, and file sharing accounts that the network implementation engine 202 can access and assign to the on-demand computing network to generate a desired user network topology. If a desired resource is not in the pool of acquired resources 206, then the network implementation engine 202 can acquire the desired resource or direct another entity to acquire the desire resource, with the resource then being assigned to the on-demand computing network 204. The network implementation engine 202 assigns the hub device 208, the rim devices 210, and communication links among them (e.g., identifying addresses with which the hub device 208 and rim devices 210 are configured to communicate with in the network 2014) to the network 204.

Following network 204 setup, in one embodiment, the network implementation engine 202 takes a hands off approach, where the network implementation engine 202 does not monitor or communicate with the network 204 while the network is in operation. In this configuration, the network implementation engine 202 receives no data about operations performed using the network 204 beyond knowledge of resources assigned to the network (e.g., as stored in records of a configuration data store). Upon receipt of a user request to add resources to the network 204 or remove resources therefrom, the network implementation engine 202 again interacts with the network 204 to implement the newly desired topology.

In one embodiment, de-provisioning of resources by the network implementation engine 202, such as at the end use of the network, is performed without direct communication with the network 204. To de-provision resources, the network implementation engine 202 communicates with providers of the resources, indicating to those providers that the resource is to be de-provisioned. The de-provisioned resource can then be recycled for use with another on-demand computing network, such as a network associated with a different user. In one embodiment, upon receipt of a de-provisioning request for a resource, a provider resets the resource (e.g., deletes stored data, such as e-mails or files) to an initial state so that it is ready for reuse. In this manner, the network implementation engine 202 acquires no further data associated with operation of the network 204.

Figure 3:
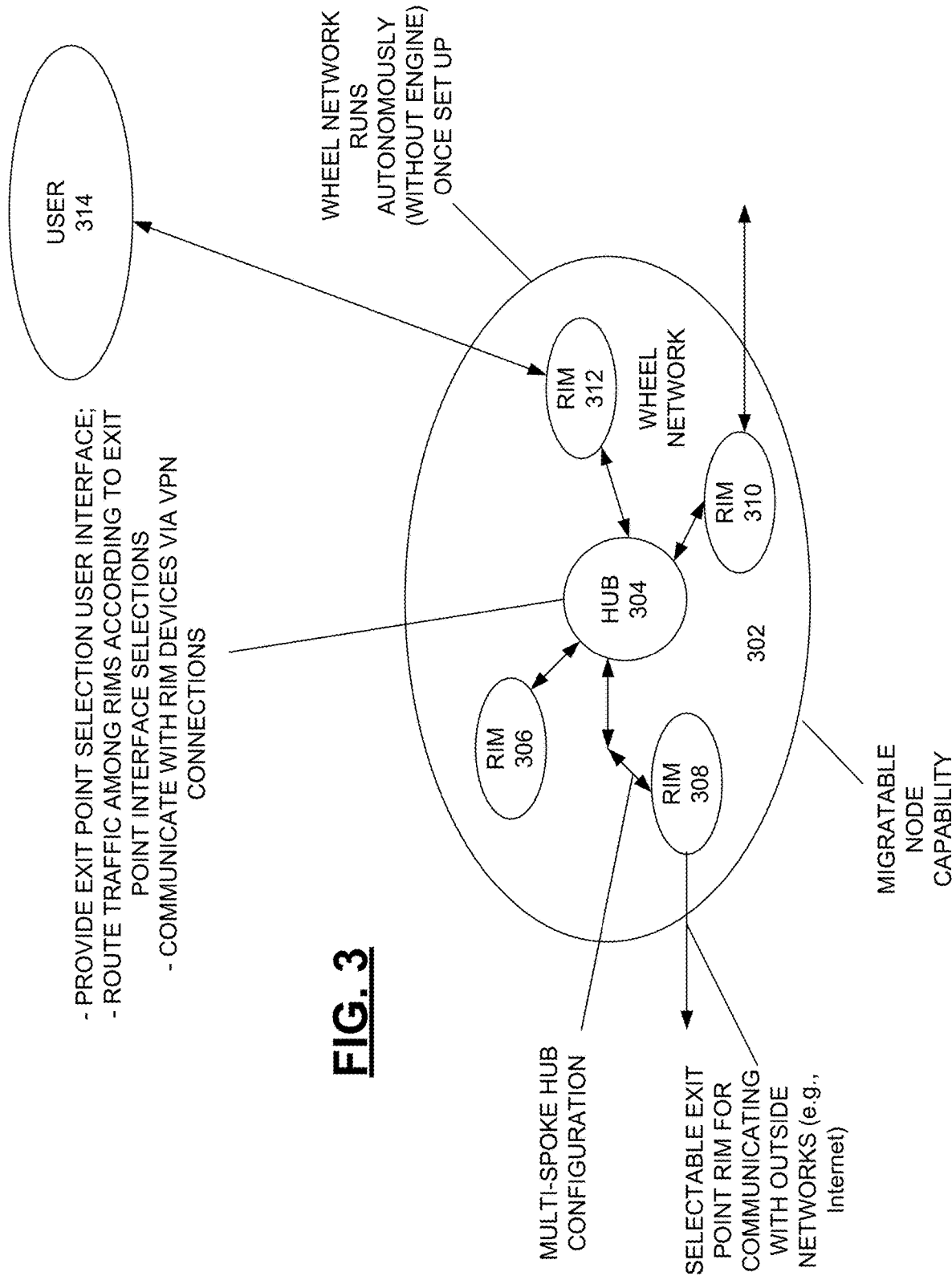
FIG. 3 is a diagram depicting an on-demand computing network in operation.

FIG. 3 is a diagram depicting an on-demand computing network in operation. Once the on-demand computing network 302 is implemented, the network 302 functions without communication with the network configuration engine.

The on-demand computing network 302 includes a hub device 304 that communicates with a plurality of rim devices 306, 308, 310, 312. Rim device 312 provides a portal for a user 314 to communicate with resources within the network 302 and computing devices external to the network 302 through the network. Rim devices 308, 310 are designated as exit points through which the network 302 can communicate traffic out of the network 302. Rim device 306 provides a network service (e.g., a file server, a mail server) accessible to a user 314, other rim devices 308, 310, 312 within the network, and computing devices external to the network via rim devices (e.g., rim device 310) that are configured to receive traffic from outside of the network 302.

In one embodiment, routing of traffic through rim devices 308, 310 designated as exit points is user configurable during network 302 operation. The hub device 304 includes a service broker operating thereon. The service broker is configured to enable configuration changes to be made to resources currently assigned to the network 302. For example, the service broker is tasked with changing routing of traffic to and from the network 302 via rim devices 308, 310 designated for communications outside of the network, on command. In one embodiment, the service broker provides a user interface to a user 314 for designation of traffic routing. The user interface includes a listing of one or more types of traffic (e.g., e-mail, Http requests) that can be transmitted from the network 302 via one of the exit point rim devices 308, 310. The user interface further includes a listing of available exit point rim devices 308, 310. The user 314 selects a traffic type and an exit point 308, 310 with which to associate that type of traffic. That type of traffic is then directed out of the network 302 through that selected exit point 308, 310. Transitions between exit points for different types of traffic can be performed on user command without requiring a user to reconnect (e.g., via a VPN connection) to the network 302.

Such operation enables a disguising of a source of data to a party receiving traffic from the network. For example, if rim device 308 is positioned in Asia, while rim device 310 is positioned in South America, user selection of rim device 308 for Http traffic instead of rim device 310 will change an apparent source of the next Http request to be Asia instead of South America. Such operations can circumvent certain computing devices external to the network 302 from blocking communications with the network 302, where those external computing devices are configured to restrict communications based on the geographic location of incoming communications.

Figure 4:
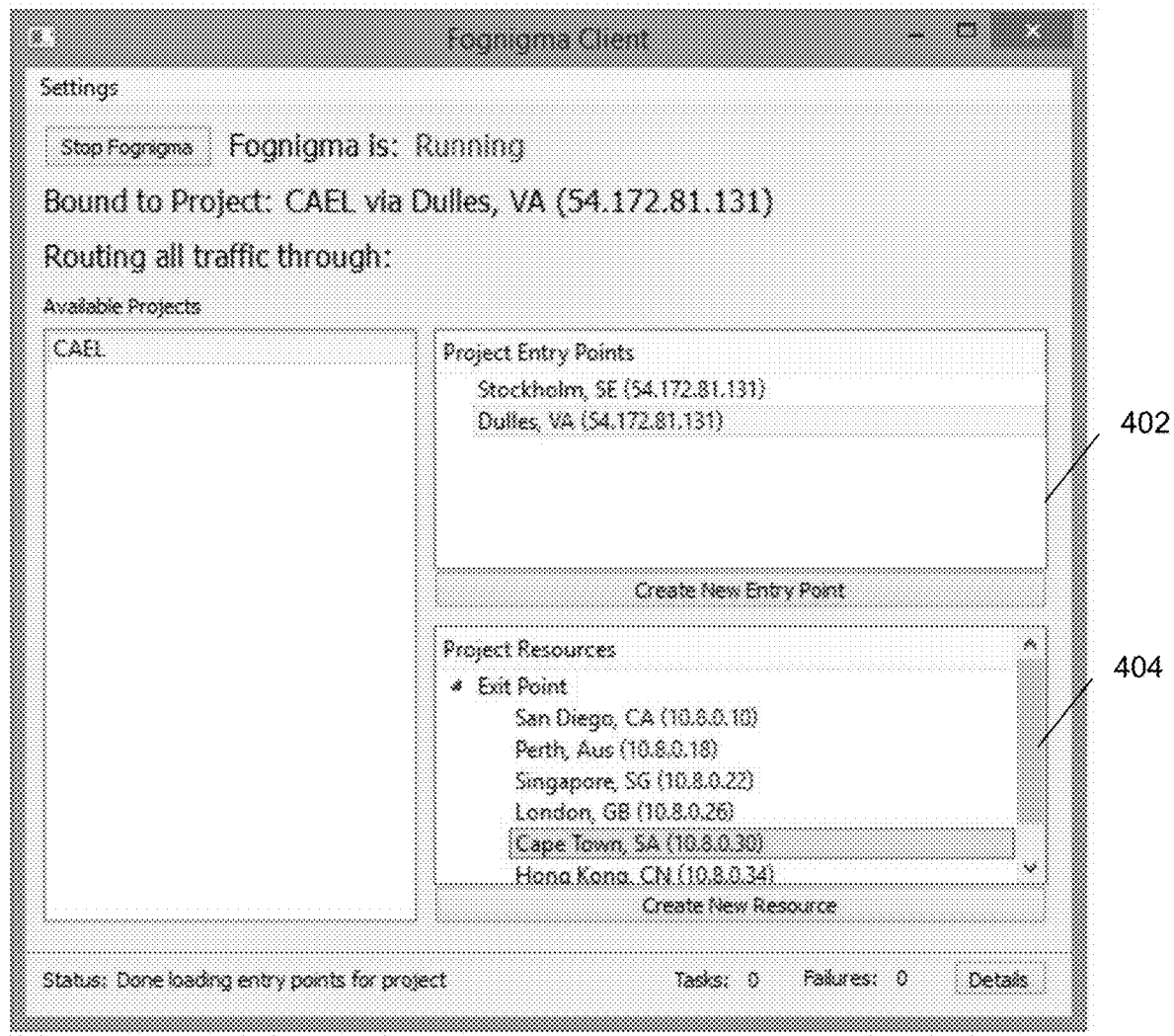
FIG. 4 is a diagram depicting an example user interface for selecting entry and exit points for an on-demand computing network.

FIG. 4 is a diagram depicting an example user interface for selecting entry and exit points for an on-demand computing network. A first portion 402 of the user interface identifies rim devices that configured to operate as entry points, where data can enter into the on-demand computing network. A second portion 404 identifies rim devices that are configured to operate as exit points, where data can be transmitted from the on-demand computing network. By toggling selection of the entry and exit points, traffic can be routed accordingly. For example, by selecting a first rim server in portion 404, traffic can be made to appear to be coming from San Diego. By changing that selection to a third entry in portion 404, that same traffic can be made to appear as originating from Singapore. It is noted that only logical address of the entry and exit points within the network are provided at 402, 404. Certain additional details regarding on-demand computer networks as described herein are provided in U.S. patent application Ser. No. 17/130,046 entitled "Systems and Methods for Implementing an On-Demand Computing Network Environment," the entirety of which is herein incorporated by reference.

In order to be accessible for clients to connect to it, any server or other host that offers services to client users or other hosts is typically accessible via a network address (e.g., an IPv4 or IPv6 internet address). In order for client hosts or users to locate a server, the server may have a constant, well-known address, or the clients must have a way to determine the server's address at any given time. Often, servers on the internet maintain one address over a very long period of time. However, once a server's location is known, that server can become the focus of malicious network activity (such as port scanning, hacking attempts, or denial-of-service attacks), or merely of unwelcome scrutiny by unauthorized third-party observers.

In embodiments, virtual machines that make up a computing network as described herein rely on knowing the network locations of their peers. In some instances, that information can be provided to them by the network implementation engine. Because the services located within those networks are accessed by end users via internally-routed networks, there is no particular reason why any specific server node of a network as described herein should necessarily remain in one network location. Certain of the following figures describe a system whereby some, if not all, of a network can be mobilized, such that individual nodes of the network can, over time, be replaced with other nodes in different network locations, geographic regions, and cloud provider networks. In this way, a network node that is the subject of malicious activity or unwanted scrutiny can, on an ad hoc or automated basis, be moved to a different network location without interrupting ongoing activities within the network.

In embodiments, networks may be organized in a star topology and include one or more of the following types of hosts (e.g., Virtual Machine (VM) hosts): one (e.g., exactly one) "Hub" node, which acts as a VPN server and a network router, directing traffic amongst other network nodes; zero or more entry point nodes, which are used by external client users and hosts to gain access to the Network; zero or more exit point nodes, which are used as gateways by users and hosts connected to the network to access the Internet outside the network, where in embodiments, a node may act as both an entry point node and an exit point node; zero or more service provider nodes offering services (e.g., chat collaboration, file storage and retrieval, LDAP, logging) to users and hosts connected to the network, zero or more dissociating joint nodes, which exist topologically between an entry, exit, or service node and a hub, in order to reduce the likelihood of a third-party observer discovering the relationship between the two nodes the joint separates.

In embodiments, each node in a network is only aware of the internet addresses of its immediately-adjacent peer(s). In this way, an entry, exit, or service node will only be aware of the IP address of a hub, or of the joint that separates it from a hub. A joint will only be aware of the IP address of a hub or another joint on one side, and of the entry/exit/service node, or another joint, on the other side. A hub will be aware of the IP addresses those nodes (whether joints, entries, exits, or service nodes) that are immediately adjacent to it.

Traffic inside of the network (e.g., between any client host and any service/entry/exit node, or between any service/entry/exit node and any other) may be encapsulated within a Virtual Private Network (VPN) layer, such that all nodes view one another as being part of a contiguous LAN or WAN, regardless of external topology. Further, traffic between any two nodes (e.g., between a hub and a service node, or between a hub and a joint, or between a service node and a joint, or between any other possible linkage between nodes in accordance with the network architecture) may contained within an additional tunnel layer (e.g., a tunnel layer implemented via the Secure Socket Funneling protocol).

Figure 5:
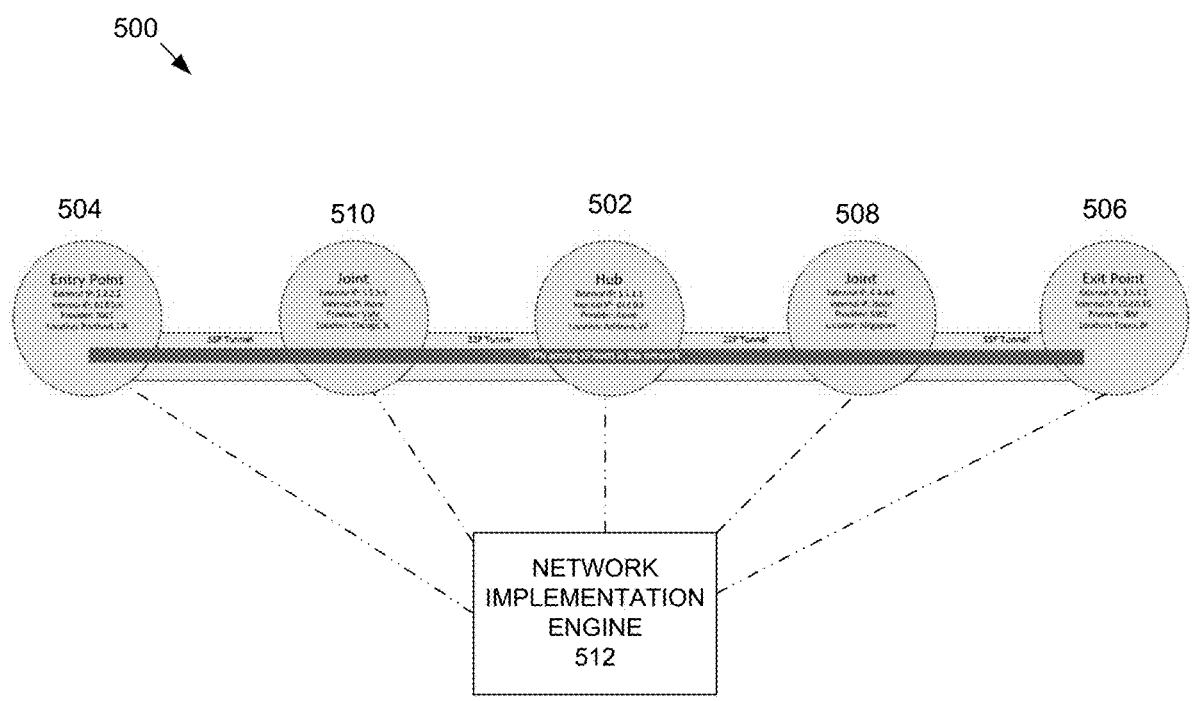
FIG. 5 is a diagram depicting an example network topology.

FIG. 5 is a diagram depicting an example network topology. The network 500 includes a hub node implemented by a virtual machine having an external IP address of 1.1.1.1. The hub node 502 is provisioned from the Azure service provider in Virginia. An entry point node 504 is configured to receive network traffic from outside of the network 500 and has an external IP address of 2.2.2.2. Node 504 is provisioned from Amazon Web Services (AWS) and is a virtual machine that physically resides in Oregon. An exit point node 506 is configured to transmit network traffic to the outside of the network 500 and has an external IP address of 3.3.3.3. Node 506 is provisioned from IBM and is a virtual machine that physically resides in Japan. Exit point node 506 is spaced from the hub node 502 by one joint virtual machine node 508 that forwards traffic between nodes 502, 506, that joint node 508 being provisioned from AWS in Singapore. Entry point node 504 is spaced from the hub node 502 by one joint virtual machine node 510 that forwards traffic between nodes 502, 504, that joint node 510 being provisioned from Vultr in Illinois. As illustrated in FIG. 5, the nodes of the network 500 are all connected to a common VPN. In addition, SSF tunnels are established between nodes (e.g., an SSF tunnel between 504-510; 510-502; 502-508; and 508-506).

As illustrated in FIG. 5, in embodiments, the network 500 may be initiated by a network implementation engine 512 that is configured to provision the virtual machines 502, 504, 506, 508, 510 that make up the network 500 from the service providers (AWS, Vultr, Azure, IBM) and to configure them to communicate with one another as depicted in FIG. 5, either by communicating with spawned nodes post provisioning or by commanding node configuration via the provisioning services. In embodiments, once the network 500 is configured, the network implementation engine 512 ceases communication with the network 500 and its nodes.

At any time after a network is operational, the engine 512 may (e.g., because of a one-time user direction, because of a scheduled event, because of a detected network anomaly such as an intrusion or other potentially malicious action) determine that one or more nodes of that network should move from their present location to a new location. If the node that is to be moved is a hub, one or more of the following steps may take place. The engine 512 uses its configured means are (e.g. as described in U.S. patent application Ser. No. 16/807,253 entitled "Obscuring Connections Between Source and Destination Devices Via a Pool of Disposable Proxies," the entirety of which is herein incorporated by reference) to construct and deploy a new virtual machine, which will become a new hub for this network.

Figure 6:
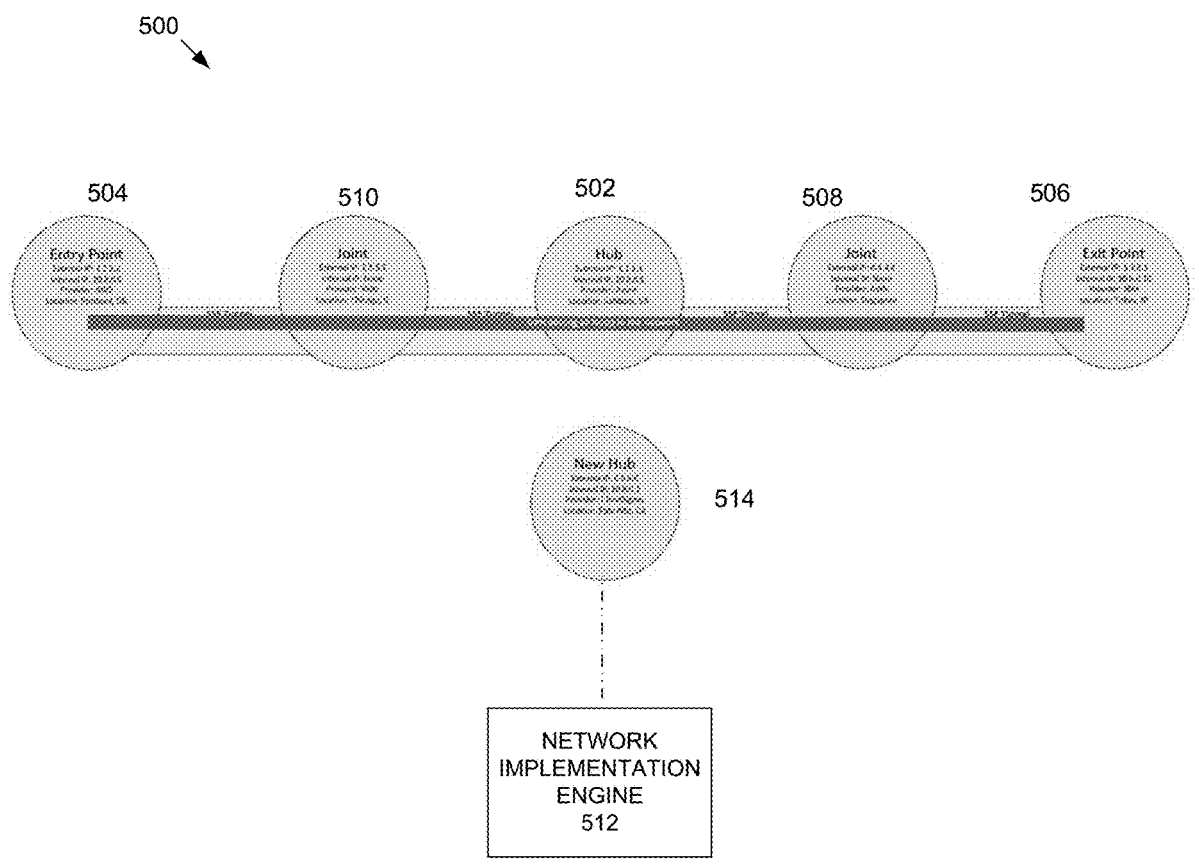
FIG. 6 depicts the network upon initial provisioning of a new hub node.

FIG. 6 depicts the network upon initial provisioning of a new hub node. The new hub may be provisioned in the same or a different cloud provider, in the same or a different geographic region. In this instance, the new hub 514 is provisioned from the CloudSigma provider in California. This new node will have a distinct IP address from the existing hub at 6.6.6.6. The engine 512 copies all pertinent data from the existing hub 502 to the new VM 514, to include the network locations of any and all peers (508, 510) the hub has established SSF tunnel connections to, as well as any routing information required for directing traffic across the VPN.

Figure 7:
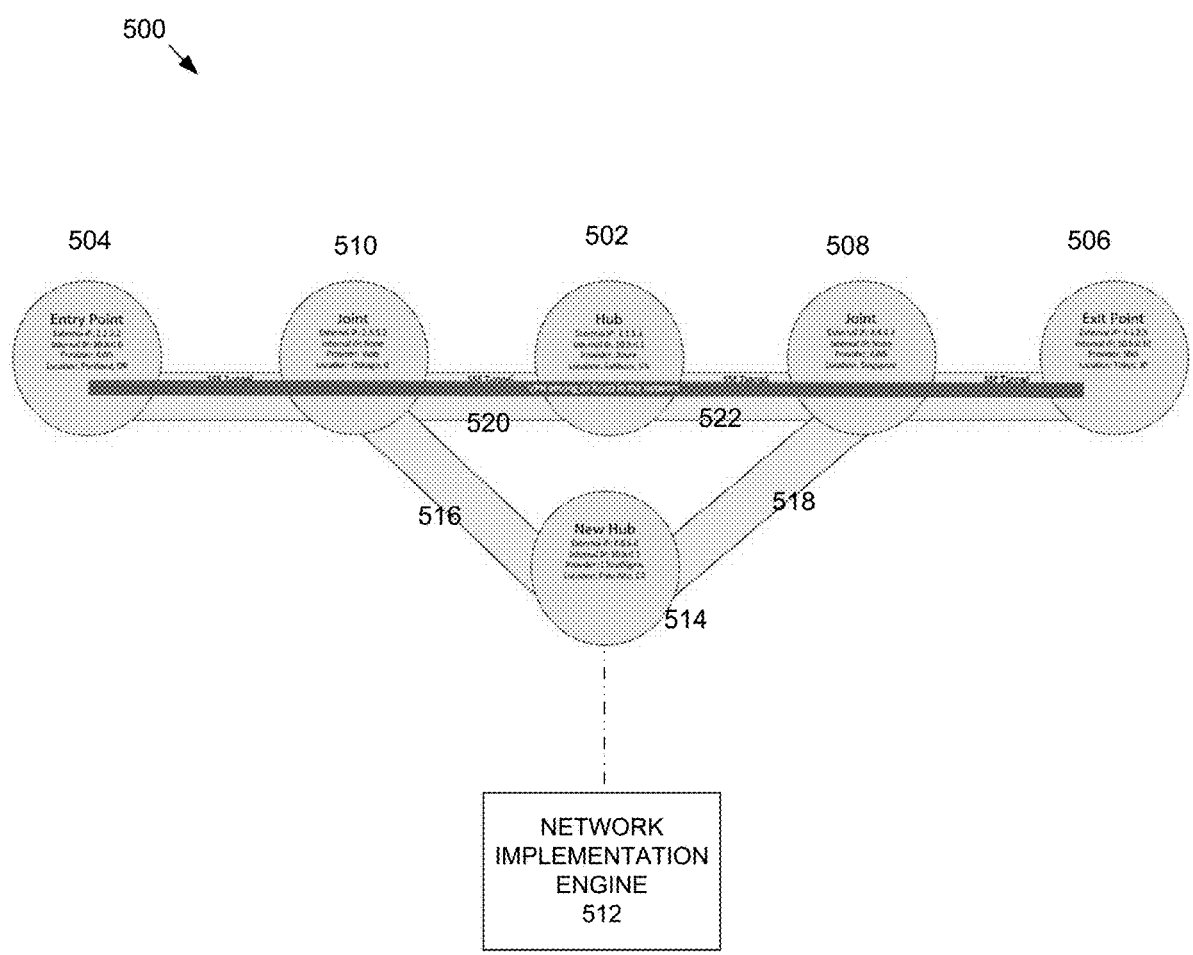
FIG. 7 depicts the network as the new hub establishes tunnels with its neighboring nodes.

FIG. 7 depicts the network as the new hub establishes tunnels with its neighboring nodes. The new hub 514, using the information it has been configured with, establishes SSF connections 516, 518 to all of its peer nodes 510, 508, respectively. Tunnels 516 and 518 are established in favor of tunnels to 520, 522, respectively. In embodiments, tunnels 520, 522 may be disabled prior to establishing of respective tunnels 516, 518.

Figure 8:
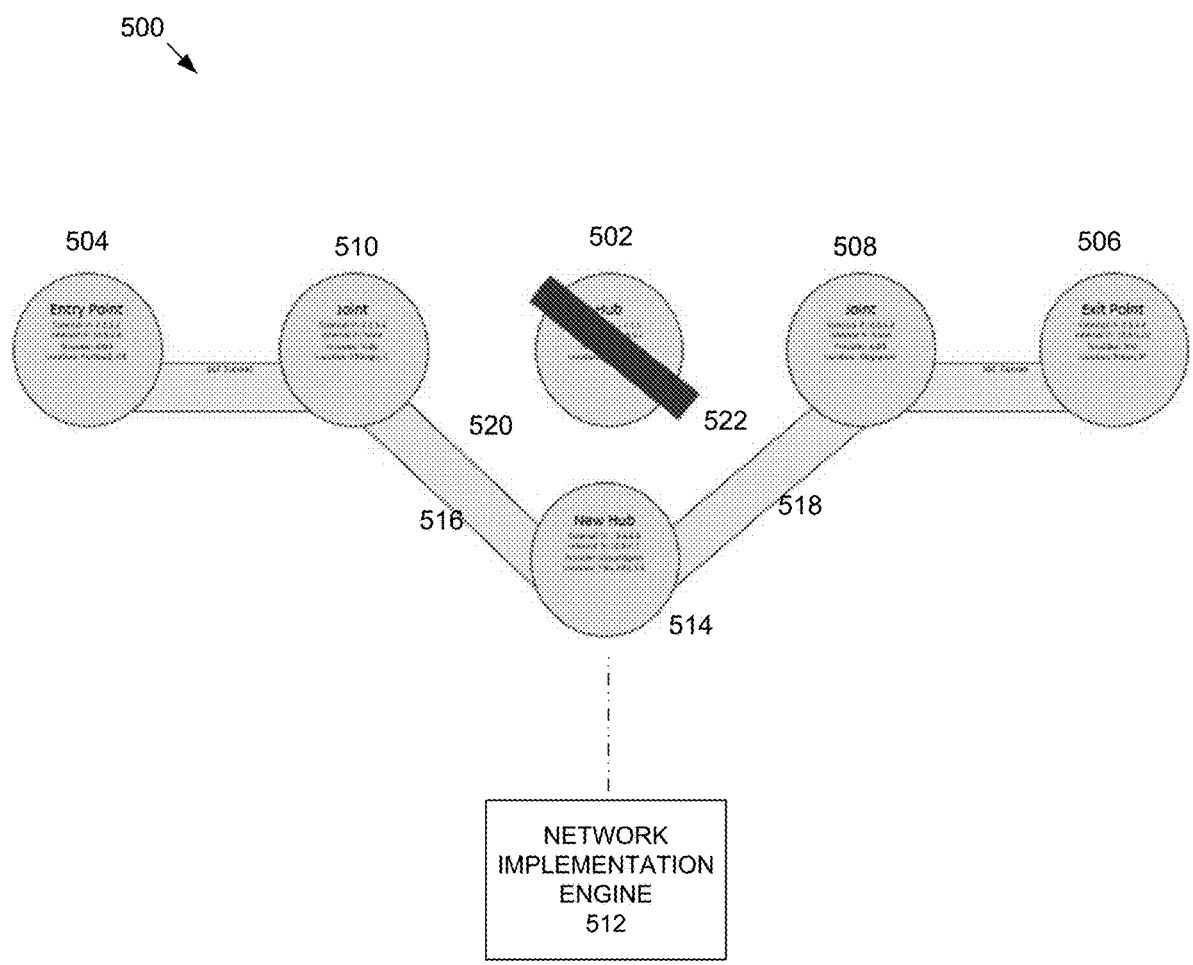
FIG. 8 depicts the network as the old hub 502 is deprovisioned.

Part of the SSF connection protocol is an establishment of TCP/IP traffic port redirection. Accordingly, the new hub 514 specifies in the connection establishment that all traffic on the VPN network port should be routed across the new SSF tunnels 516, 518 to itself. FIG. 8 depicts the network as the old hub 502 is deprovisioned. The engine 512 directs the cloud provider where the old hub 502 is provisioned to delete the VM instance where the old hub 502 is running. All of the SSF tunnels 520, 522 between the old hub 502 and its peers collapse, and the endpoint nodes that were connected to that hub 502 via VPN have their connection interrupted.

Figure 9:
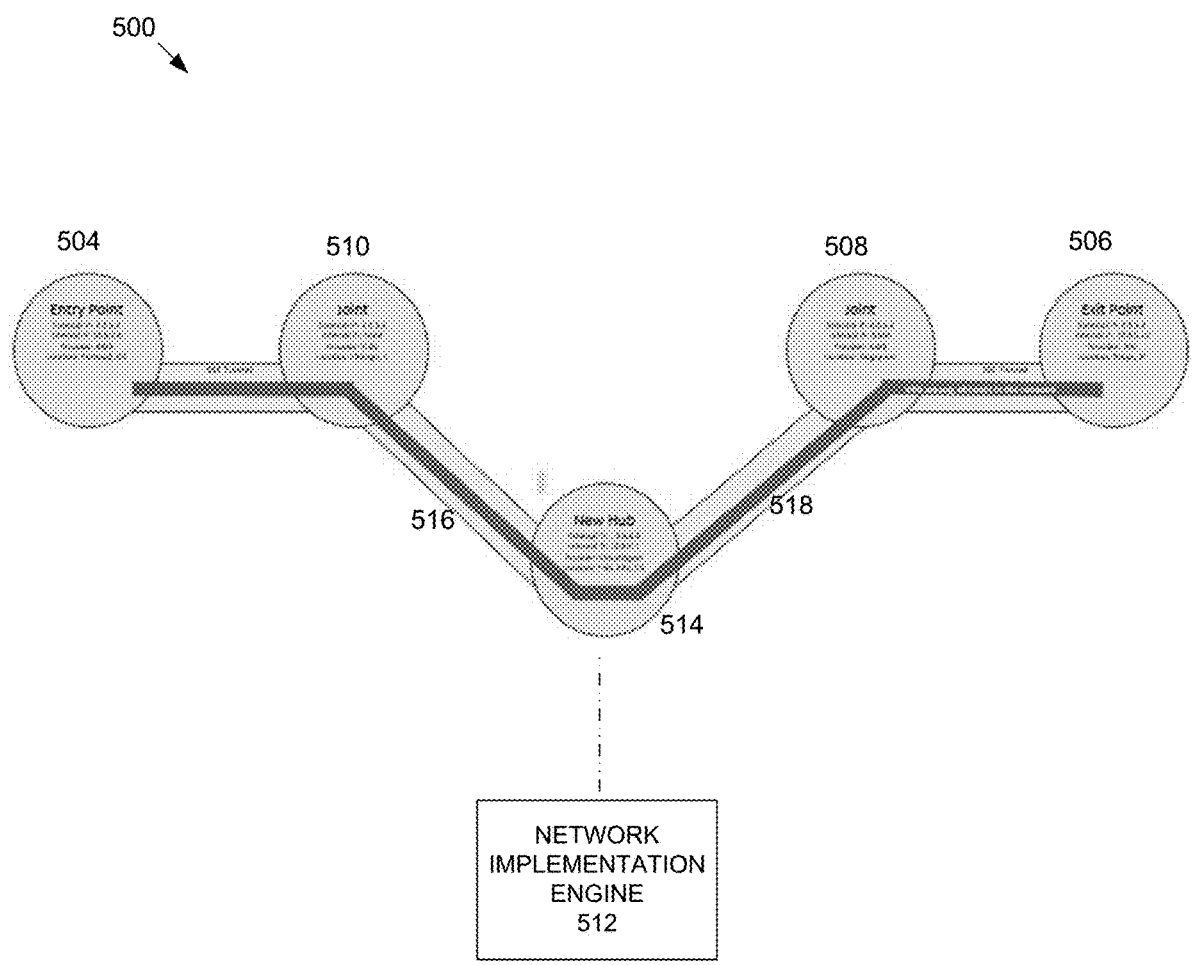
FIG. 9 depicts the network after the old hub has been deprovisioned.

FIG. 9 depicts the network after the old hub has been deprovisioned. The endpoint nodes 504, 506 automatically attempt to re-establish VPN connectivity with their configured server. Because of the new SSF tunnel configuration, their connections are routed to the new hub 514, which is running a VPN server with appropriate certificates, so the endpoint nodes accept it as legitimate, and form VPN connections with it. Thus traffic begins to flow again as normal.

Figure 10:
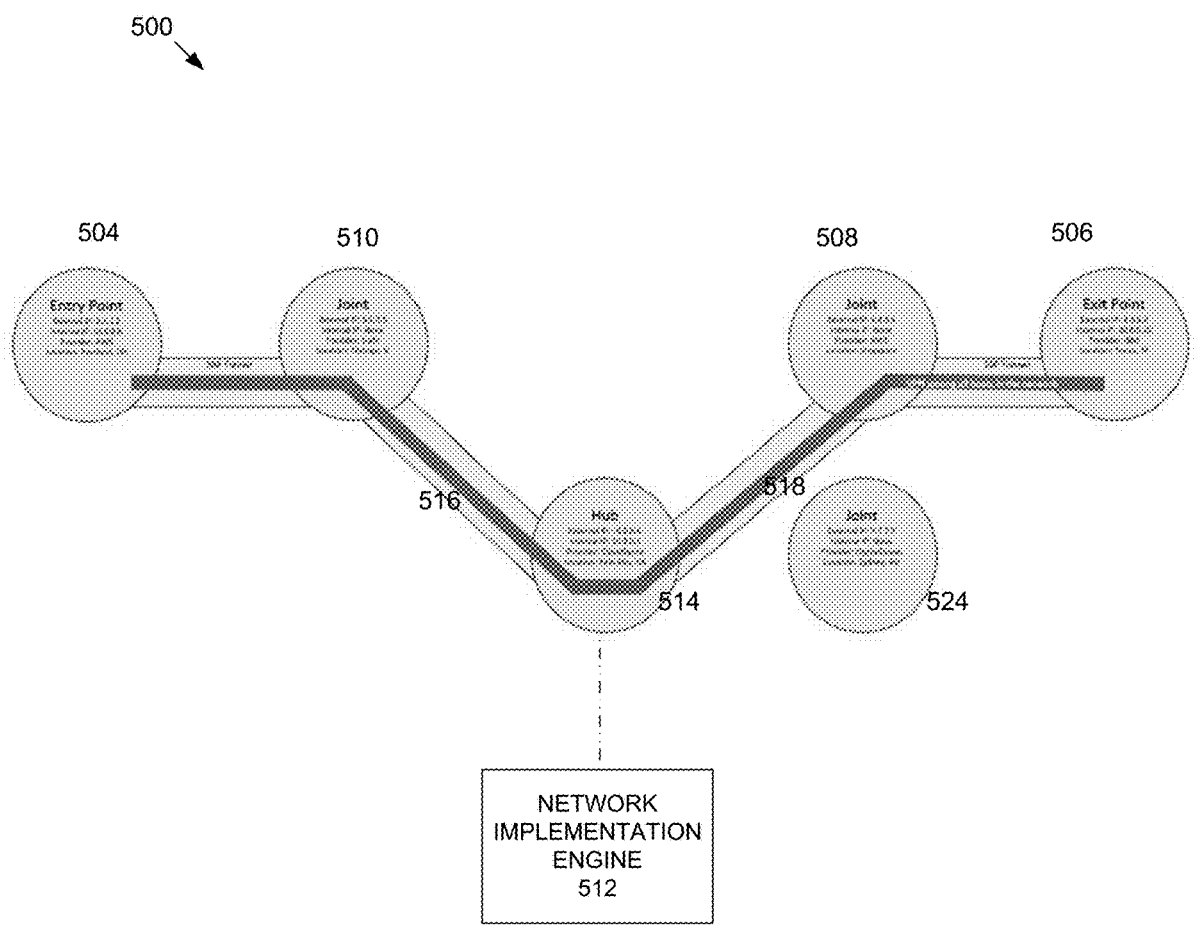
FIGS. 10-12 depict example steps for moving a non-hub node.
Figure 11:
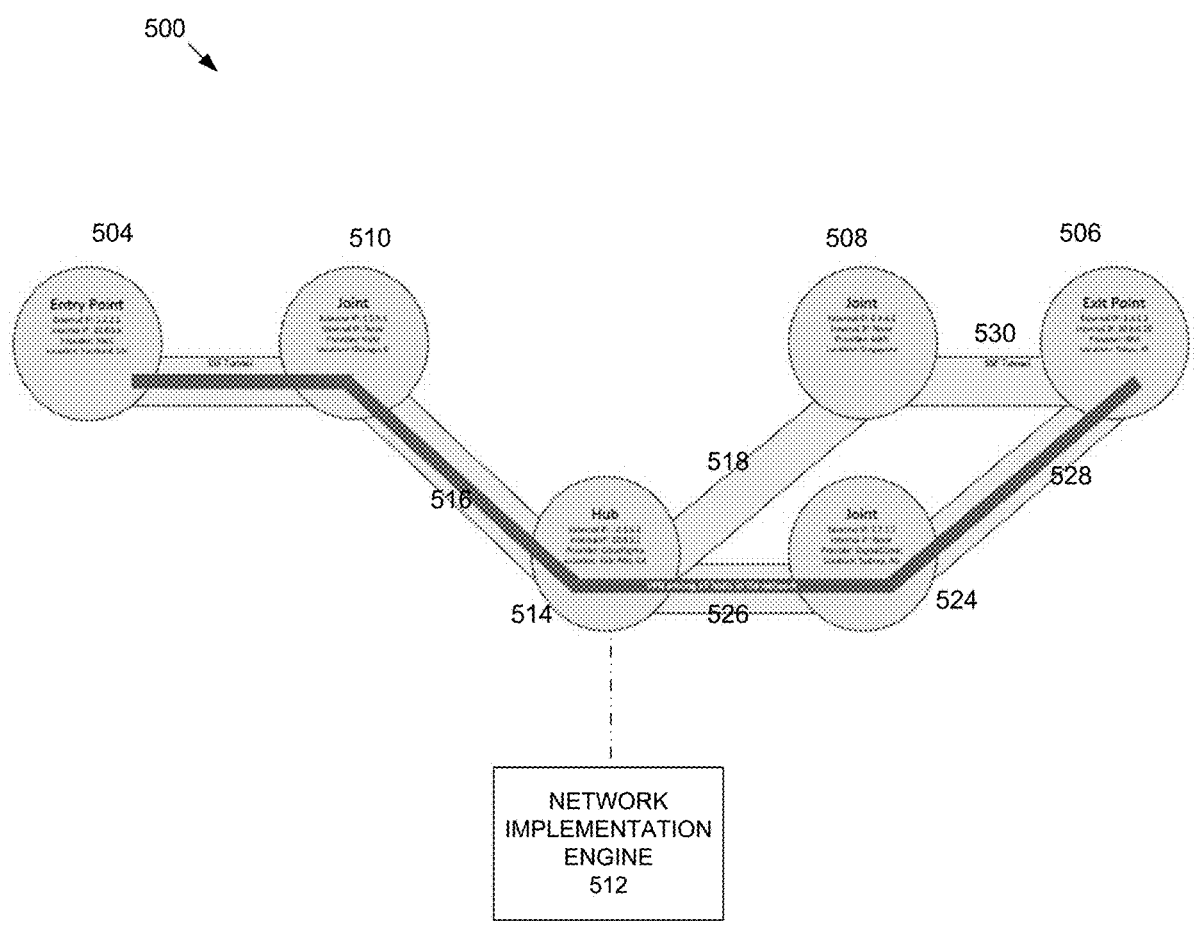
Figure 12:
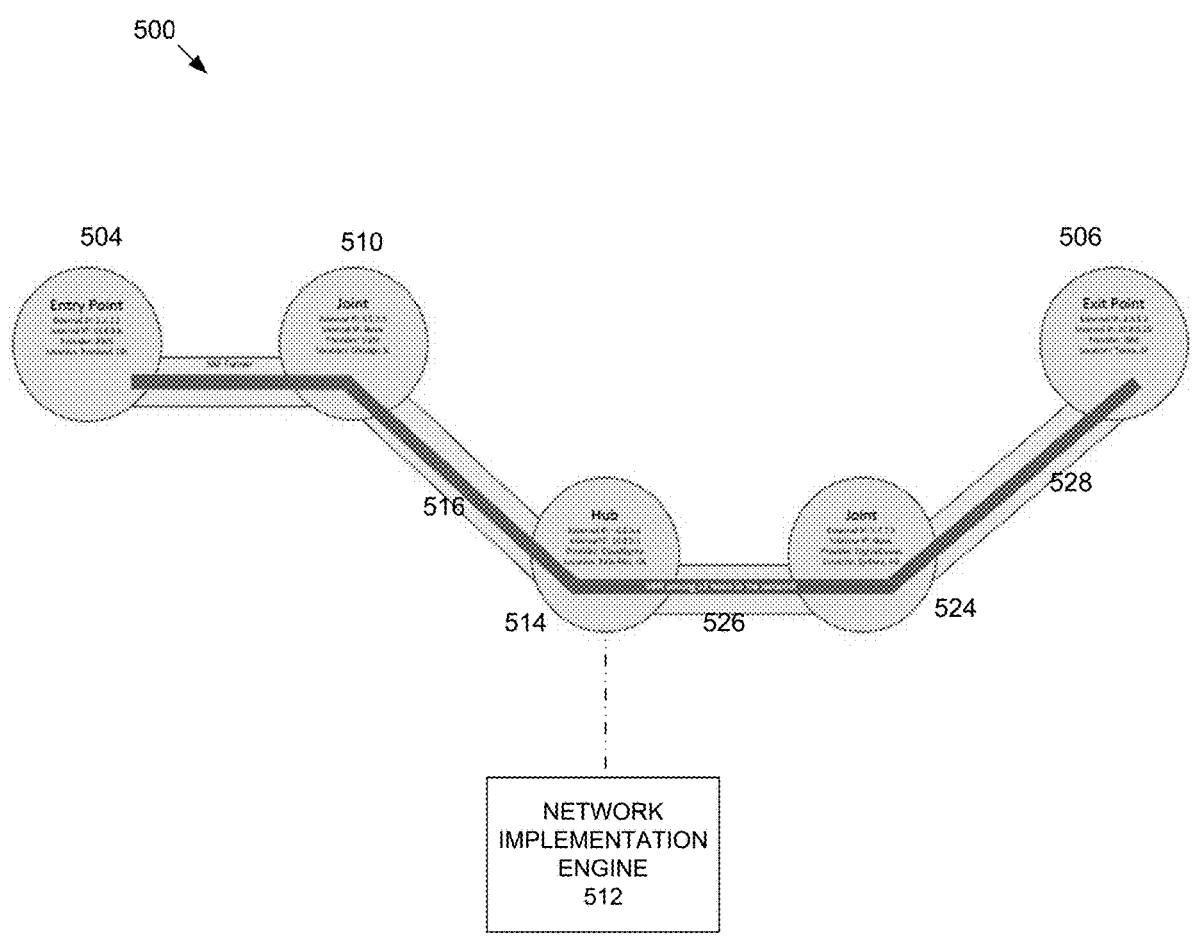

FIGS. 10-12 depict example steps for moving a non-hub node. When the node that is to be moved is any other type of node within the system, one or more of the following steps may take place. As depicted in FIG. 10, engine 512 uses whatever its configured means are to construct and deploy a new virtual machine (e.g, from DigitalOcean in Australia), which will become the new joint node 524. The new node 524 may be provisioned in the same or a different Cloud Provider, in the same or a different geographic region. This new node 524 will have a distinct IP address (7.7.7.7) from the existing joint node 508 it will be replacing. The engine 512 will copy all pertinent data from the old node 508 to the newly-provisioned one 524, including (if the node 508 is a joint) the IP address of that node's downstream peer 506. The engine 512 also configures the node 514 that is upstream of the node 508 that is being replaced (e.g., a hub or a joint) to indicate that the new node 524 is now its downstream Peer.

As shown in FIG. 11, the upstream Node 514 (e.g., hub or joint) establishes a new SSF tunnel connection to the new node 524 in favor of the old tunnel 518 (which may be deleted or collapsed before or after tunnel 526 is established), and indicates that all VPN traffic from the new node 524 should be redirected across this new tunnel 526. If the new node 524 is a joint, then (e.g., simultaneously or substantially simultaneously (within a second, within a minute)) the new node 524 establishes a new SSF tunnel 528 to its configured downstream node 506 and specifies that all VPN traffic from the downstream node 506 should be directed across that new tunnel 528 in favor of the old tunnel 530 which has been or is to be collapsed. Because of the new redirection order(s), VPN traffic immediately begins flowing across the new tunnel(s) 526, 528. As shown in FIG. 12, the engine 512 deletes the old node 508. All tunnels to and from that node 508 collapse, and traffic continues to flow across the new path. The engine 512, to the extent that it was in direct contact with any nodes of the network (e.g., newly established node 524, hub 514) may then discontinue communications with those entities.

Figure 13:
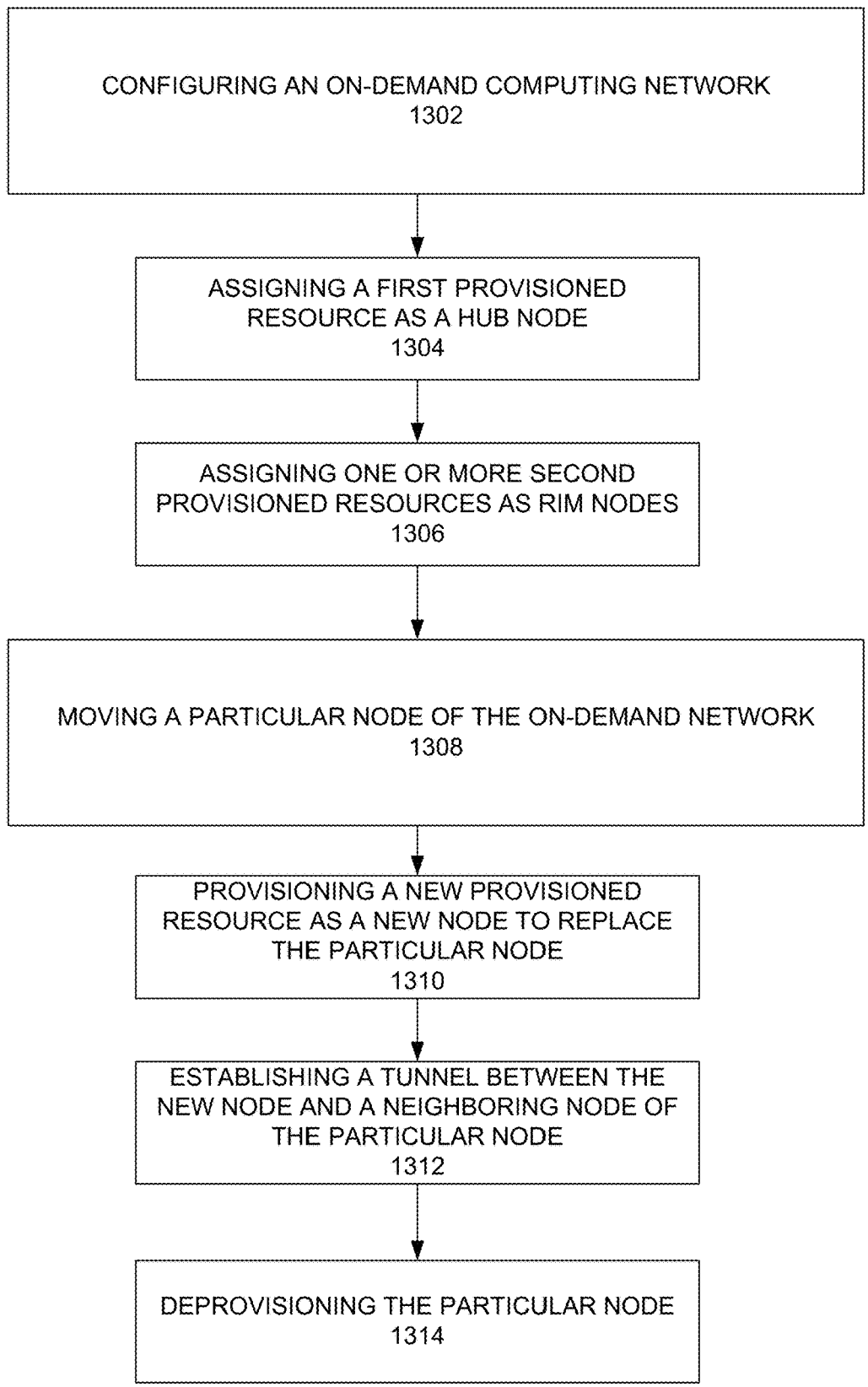
FIG. 13 is a flow diagram depicting an example method of implementing an on-demand computing network environment.

FIG. 13 is a flow diagram depicting an example method of implementing an on-demand computing network environment. At 1302, a system configures an on-demand computing network, wherein configuring includes assigning a first provisioned resource as a hub node at 1304; and assigning one or more second provisioned resources as rim nodes at 1306, wherein rim nodes are configured to communicate with one another via the hub node. They example method further moves a particular node of the on-demand computing network at 1308 by provisioning a new provisioned resource at 1310 as a new node to replace the particular node and configuring the new provisioned based on parameters associated with the particular node; establishing a tunnel between the new node and a neighboring node of the particular node at 1312; and deprovisioning the particular node such that traffic between the new node and the neighboring node traverses the established tunnel at 1314.

Examples have been used to describe the invention herein, and the scope of the invention may include other examples. For example, an on-demand computing network environment could be implemented without any hubs or joints in a wheel, such as a single rim-to-rim network or a one-rim-to-many-rims network, or a many-rims-to-many-rims network. As a further example, an on-demand computing network environment could include one or more of a first rim device connected to a second rim device via one or more joints; multiple joints connected without inclusion of a hub device; a one-to-many joint connection; and a many-to-many joint connection. Additionally, submitted herewith are presentation slides depicting additional examples, the entirety of which are herein incorporated by reference.

It is claimed:

1. A computer-implemented method of implementing an on-demand computing network environment, comprising:
    configuring an on-demand computing network that comprises nodes, the nodes comprising at least a hub node and one or more rim nodes;
moving a particular node of the on-demand computing network by:
    provisioning a provisioned resource as a new node to replace the particular node;
    establishing a tunnel between the new node and a neighboring node of the particular node; and
    deprovisioning the particular node.

2. The computer-implemented method of claim 1, wherein the nodes of the on-demand computing network communicate with one another via a virtual private network.

3. The method of claim 2, wherein when the particular node is the hub node, moving the particular node comprises:
    establishing tunnels between the new node and a plurality of joint nodes or the one or more rim nodes;
    wherein existing tunnels between the particular node and the plurality of joint nodes or the one or more rim nodes collapse or are disabled;
    wherein the virtual private network is interrupted; and
    reestablishing the virtual private network via the new node.

4. The method of claim 2, wherein one or more of the nodes of the on-demand computing network accept the new node as part of the virtual private network based on certificates held by the new node.

5. The method of claim 3, wherein the existing tunnels are collapsed or disabled prior to establishing tunnels between the new node and the plurality of joint nodes or the one or more rim nodes.

6. The method of claim 2, wherein when the particular node is not the hub node, moving the particular node comprises:
    establishing at least one tunnel between the new node and the hub node, the one or more rim nodes, one or more joint nodes, or a combination thereof;
    wherein existing tunnels between the particular node and the hub node, the one or more rim nodes, the one or more joint nodes, or the combination thereof collapse or are disabled;
    wherein the virtual private network is not interrupted as part of moving the particular node that is not the hub node.

7. The method of claim 1, wherein the hub node is the only hub node in the on-demand computing network.

8. The method of claim 1, wherein the hub node and one or more of the one or more rim nodes are provisioned from different, third-party computing resource providers.

9. The method of claim 1, wherein the tunnel is a secure socket funnel (SSF) tunnel.

10. The method of claim 1, wherein one of the one or more rim nodes is designated as an exit point, wherein the on-demand computing network transmits traffic out of the on-demand computing network only through the exit point rim node or another of the one or more rim nodes identified as an exit point.

11. The method of claim 1, where two or more of the one or more rim nodes are identified as exit points, wherein a service broker module at the hub node is configured to receive a user command to designate one of the exit point rim nodes from which to transmit traffic from the on-demand computing network.

12. The method of claim 11, further comprising:
    providing a user interface that identifies one or more types of traffic and identifications of the exit point rim nodes;
    upon user selection of a traffic type and a specific exit point rim node, directing traffic of the selected traffic type from the on-demand computing network via the specific exit point rim node.

13. The method of claim 1, wherein at least one of the one or more rim nodes is a non-exit point, wherein the non-exit point rim node provides a computing service.

14. The method of claim 13, wherein the computing service is a file server service or a mail server service.

15. The method of claim 1, wherein the configuring is performed using an external engine, wherein the provisioned resource can be added and removed from the on-demand network only using the engine.

16. The method of claim 1, further comprising:
    de-provisioning the provisioned resource assigned to the on-demand computing network using an external engine, wherein the engine does not communicate with the provisioned resource being de-provisioned.

17. A computer-implemented system for implementing an on-demand computing network environment, comprising:
    a non-transitory provisioned resource data store configured to store records associated with resources provisioned from one or more resource providers;
    a network implementation engine comprising data-processing hardware, the network implementation engine configured to:

assign a first provisioned resource as a hub node and one or more second provisioned resources as rim nodes;

move a particular node of the on-demand computing network by:

provisioning a new provisioned resource as a new node to replace the particular node;

establishing a tunnel between the new node and a neighboring node of the particular node; and deprovisioning the particular node.

18. A non-transitory computer-readable medium encoded with instructions for commanding one or more data processors to execute a method for implementing an on-demand computing network environment, the method comprising:

configuring an on-demand computing network that comprises a hub node and one or more rim nodes;

moving a particular node of the on-demand computing network by:

provisioning a provisioned resource as a new node to replace the particular node;

establishing a tunnel between the new node and a neighboring node of the particular node; and deprovisioning the particular node.

19. The method of claim 1, wherein the on-demand computing network is configured such that each node is not aware of the IP address of any node that is not immediately-adjacent.

20. The method of claim 1, wherein the configuring is performed using an external engine, wherein the engine copies all pertinent data from the particular node to the new node.

* * * * *